United States Patent [19]

Oliver, Jr. et al.

[11] Patent Number: 4,588,031
[45] Date of Patent: May 13, 1986

[54] WELL CEMENTING PROCESS

[76] Inventors: John E. Oliver, Jr.; Arnold M. Singer, both of Clear Fluids, Inc. P.O. Box 27526, Houston, Tex. 77227

[21] Appl. No.: 621,695

[22] Filed: Jun. 18, 1984

Related U.S. Application Data

[63] Continuation-in-part of Ser. No. 460,130, Jan. 24, 1983, Pat. No. 4,474,240, and Ser. No. 450,519, Dec. 17, 1982, Pat. No. 4,515,699.

[51] Int. Cl.$^4$ ............... E21B 33/16; E21B 37/00
[52] U.S. Cl. .................... 166/291; 166/312; 252/8.55 B
[58] Field of Search ............... 166/291, 312; 252/8.55 R, 8.55 B

[56] References Cited

U.S. PATENT DOCUMENTS

| | | | |
|---|---|---|---|
| 2,414,668 | 1/1947 | Ratcliffe | 166/312 X |
| 2,612,954 | 10/1952 | Hamilton, Jr. | 166/291 X |
| 3,022,823 | 2/1962 | Caldwell et al. | 166/291 |
| 3,412,025 | 11/1968 | Ostroff | 252/8.55 B |
| 3,653,441 | 4/1972 | Tuttle | 166/291 |
| 3,837,402 | 9/1974 | Stringer | 252/8.55 B X |
| 3,884,302 | 5/1975 | Messenger | 166/291 |
| 4,141,843 | 2/1979 | Watson | 166/291 X |
| 4,217,229 | 8/1980 | Watson | 166/291 X |

OTHER PUBLICATIONS

Richard C. Haut, Ronald J. Crook, "Primary Cementing: The Mud Displacement Process", Paper No. 8253, Society of Petroleum Engineers of the American Institute of Mining, Metallurgical and Petroleum Engineers, Sep. 26, 1979.
Haliburton's Super Flush Spacer (1983).
Primary Cementing: The Mud Displacement Process SPE 8253 by Richard C. Haut et al. (1982).
Spacers and Their Applications in Primary Cementing; Richard C. Crook et al. (1982).

Primary Examiner—George A. Suchfield
Attorney, Agent, or Firm—Vaden, Eickenroht, Thompson & Jamison

[57] ABSTRACT

Improved bonding in a well system between cement, well tubular members and the formation about the well-/bore at a pay zone. Drilling fluid materials (mud, solids, filter cake, etc.) are displaced at turbulent flow conditions by a slug of concentrate consisting essentially of a water-free mixture of surfactant and alcohol. The aqueous fluid cement immediately follows the slug. Residual filter cake and tubular member are water-wetted. The cement on hardening has an improved bonding to both tubular members and formation at the pay zone.

9 Claims, No Drawings

WELL CEMENTING PROCESS

CROSS REFERENCE TO RELATED APPLICATIONS

This application is a continuation-in-part of co-pending application Ser. No. 460,130 filed Jan. 24, 1983 entitled "Dirt Magnet Spacer Displacement Process, now U.S. Pat. No. 4,474,240 and co-pending application Ser. No. 450,519 filed Dec. 17, 1982 entitled "Chemically Cleaning Drilling/Completion/Packer Brines", now U.S. Pat. No. 4,515,699.

BACKGROUND OF THE INVENTION

1. Field of the Invention

This invention relates to the cleaning of well bores prior to cementing operations, and it more particularly relates to cleaning of well bores to improve cement bonding to formations and tubular members at the pay zone.

2. Description of Prior Art

It is common practice to clean a well bore at the pay zone before cementing operations to insure good bonding between the cement, well tubular members and formation. Present cement flushes remove drilling fluid and mud filter cake to insure clean well bores before introduction of the aqueous fluid cement. For example, a flush fluid can be used as a spacer before the cement so as to displace the mud materials. These spacers are used in relatively large amounts to insure cleaning of the well bore. However, water in the flush fluid and/or the cement slurry being used, cause viscosity and mobility changes in the mud residing in the well bore. As a result, channeling of the flush, and following cement, through the mud residues cause poor bonding of the cement to the formation and tubular members. Where the mud residues are from oil based mud, these problems are greatly increased.

The presence of water in the flush causes other severe problems. In pay zone formations sensitive to swelling (e.g. shales), presence of substantial water in the flush can (1) remove all mud filter cake from the well bore, (2) prevent proper cement bonding to the formation and (3) greatly reduced the permability of swelling formations. Unfortunately, cement slurries adversely effect residual mud materials and usually they become thickened with corresponding viscosity increases. Usually, these mud residue properties are caused by changes in the alkalinity drawn from the cement slurries. The thickened mud residues are less easily removed, and therefore more mud residue remains to degrade the cement bonding result. When oil based muds are used in the well bore, these undesired results are even more pronounced.

SUMMARY OF THE INVENTION

In accordance with this invention, there is provided a process for improved bonding in a well system between cement, the well tubular members (e.g., casing and string) and the formation about the well bore at the pay zone. The drilling fluid materials, including mud, solids and filter cake, are displaced at turbulent flow conditions from the annulus between the tubular member and formation by circulating therein a slug of a concentrate consisting of a water free mixture of surfactant and alcohol. The slug of concentrate is followed by the aqueous fluid cement. The displaceable drilling fluid materials are removed from the annulus but some residual filter cake remains on the formation. The well tubular members and residual filter cake reside in a surface water-wetted condition. Hardening of the cement produces an improved bonding to both the well tubular members and the formation at the pay zone.

In its preferred composition, the concentrate is an equal component mixture of the amide reaction product of diethanol amine with oleic acid, which reaction product is neutralized with triethanol amine, and the alcohol is 2 ethyl hexanol. The slug is used in a volume to cover the well bore annulus at the pay zone during displacement.

DESCRIPTION OF THE PREFERRED EMBODIMENT

The present process is practiced in conventional wells having surface equipment used for drilling and completion, and especially for carrying out the cementing of the formation zone to be placed into production, i.e. the pay zone. The well can have various types of tubular members, such as casing and production tubing at the pay zone. The surface equipment can be used for this process as long as a small slug of the present unique concentrate can be introduced immediately ahead of the incoming aqueous fluid cement. It will be assumed that the well will be subjected to normal cementing flows, i.e. downwardly in the tubing and upwardly in the annulus between the tubing, casing and/or exposed formation. However, the process can be used in several flow arrangements.

At the beginning of this process, it will be assumed that the well is yet filled with drilling fluid materials, such as drilling mud, solids of various kinds including cuttings and barite, and filter cake in the annulus between the tubular members and the formation at the pay zone. In accordance with conventional practices, the cementing operations will be coextensive with this annulus throughout the pay zone.

The slug of concentrate is introduced as a spacer immediately ahead of the aqueous fluid cement. The slug is introduced into the tubing in a relatively small volume, e.g. 1-10 barrels. Usually, the slug volume needs to be not greater than will fill volumetrically the well bore annulus throughout the vertical extent of the pay zone in the formation of interest. The aqueous fluid cement is introduced into the casing on top of the slug and pumped in a conventional manner to the pay zone where it is desired to be hardened into an isolating barrier.

The linear velocity of the slug being displaced through the wellbore depends upon the hole diameter or annulus size and usually ranges between 80 and 200 feet per minute to maintain the laminar flow condition for the non-Newtonian drilling fluid materials, which have at flow conditions a Reynolds number of about 100.

At these linear velocities, the slug of concentrate is at turbulent flow conditions as a result of its greater Reynolds number since it is a Newtonian fluid.

The turbulent flow of the slug removes the displaceable drilling fluid materials. The displaced drilling fluid materials are thoroughly suspended, as a floc by electrically charged regime, in the slug and within the slug they are removed away from the well bore at the pay zone in the formation. The tubular members and exposed formation at the pay zone are now free of loose drilling fluid materials, and they are in a surface water-wetted condition. More particularly, the slug of concentrate has penetrated the filter cake on the formation to remove loose materials. As a result, the aqueous fluid cement arrives at the pay zone in optimum condition because of the clean and debris free condition of the tubular members and formation, even though it is covered by some remaining thickness of filter cake.

When the cement hardens, a good cement, to metal and formation bonding is produced. The water-wetted filter cake especially allows the cement to penetrate the formation at the well bore with greatly increased bonding strength.

The slug efficiently displaces the drilling fluid before it, and yet it is efficiently displaced volumetrically by the aqueous fluid cement. Even oil-based mud materials are effectively displaced by the slug which efficiently removes the displaceable drilling fluid materials leaving a clear and water-wetted surface environment before the incasing acqueous fluid cement.

The displaced drilling fluid and slug can remain in the well bore after the cement has hardened. However, they can be removed by annulus displacement techniques, if desired.

The slug is a relatively water-free concentrate, and it preferably has less than 5 percent of water (by volume). The concentrate is a unique mixture of alcohol and surfactant.

The alcohol can be an aliphatic alcohol with between 5 and 8 carbon atoms and the surfactant is a surface active chemical aid with a molecular weight in the range of about 150 to about 500 with predominately hydrophobic characteristics. The surfactant is selected from the group comprising aliphatic amines, amides and aliphatic amine oxides wherein the amine and amide and amine oxide constituents have an alkyl group with between 8 and 18 carbon atoms.

In the preferred embodiment, the alcohol is 2-ethyl-hexanol and the surface active chemical aid is an amine or preferably an amine reaction product salt and each chemical is used in about equal amounts by volume in the concentrate. Reference may be taken to our mentioned application for a more detailed description of these chemicals.

Other alcohols that work well include n-pentanol, n-hexanol and octanol. The 2-ethyl hexanol can be obtained from Tenneco Chemicals, Inc., and it has a relatively high COC flash point of 183° F., with a specific gravity of about 0.83 at 77° F.

Other examples of amines usable in this invention are cocoamine, octylamine, dioctylamine, decylamine and dodecylamine. Cocoamine may be generally represented by the formula $CH_3(CH_2)_{10}CH_2-NH_2$ and it is prepared from monoethenoid fatty acids derived from coconuts. The "coco" group $C_{12}H_{25}$ is not a group containing a specific number of carbon atoms, but is a number of individual groups containing different numbers of carbon atoms. However the $C_{12}H_{25}$ group is in greater amount than any other group.

The cocoamine may be a condensation product, i.e., oxalkylated cocoamine such as ethoxylated cocoamine with between 2 and 15 mols of ethylene oxide. More particularly, the condensation product is formed by subjecting cocoamine to a condensation with a plurality of mols of ethylene oxide in a manner well known in the art. In general, the condensation product of a mol of cocoamine with between 2 and 15 mols of ethylene oxide may be employed with good results. Preferably the condensation product is formed by condensing 10 mols of ethylene oxide per mol of cocoamine. Expressed on the basis of molecular weight, the ethoxylated cocoamine may have an average molecular weight between 285 and 860, but preferably, has an average molecular weight of about 645.

Preferably, the surfactant is the amide reaction product of a fatty monobasic acid and a secondary amine, and the amide reaction product salt with a tertiary amine. More particularly, the fatty acid can be given the formula $C_NH_{2N+1}COOH$ wherein N is an integer between 12 and 18. The fatty acid can be selected from the group of oleic and dimerized oleic, linoleic, palmit oleic, palmitic, myristic, myrestoleic and stearic acids. The oleic acid amide products give good results.

The secondary amines are selected from normal aliphatic amines that react with the fatty monobasic acids to form fatty amides that are generally used as nonionic emulsifiers. Good results are obtained when these amines are selected from the group consisting of diethanol amine.

One amide reaction product surfactant giving excellant results with 2-ethyl hexanol is a product of Witco Inc., and available under the tradename Witcamide 1017 (surfactant). This product is reported to be the amide reaction product of oleic acid and diethanol amine, which reaction product is neutralized with triethanol amine. It has a specific gravity of 1.0 (same as water) is amber with a PMCC flash point above 200° F., and it is a product not hazardous under current Department of Labor definitions.

The operation theory in the slug concentrate of the alcohol and surface active chemical aid in the present process could not be determined within certainty from information presently available. It is believed that the alcohol serves to destabilize the dispersed solids by disrupting their electrophretic charges, and then the surfactant acts to gather the solids, and assembled oily materials, into a loose solids system that can be removed subsequently by careful liquid/solids phase separation techniques which do not impose shear or mixing energy during solids removal.

From the foregoing, it will be apparent that there has been herein described a process for removing drilling fluid materials from a well bore which is especially effective prior to introduction of aqueous fluid cement for improved cement bonding results. Various changes and alterations may be made in the practice of this process by those skilled in the art without departing from the spirit of the invention. It is intended that such changes be included within the scope of the appended claims. The present description is intended to be illustrative and not limitative of the present invention.

What is claimed is:

1. A process for improved bonding in a well system between cement, and well tubular members and the formation about the well bore at a pay zone, the steps comprising:
   (a) displacing at turbulent flow conditions drilling fluid materials, including mud, solids and filter cake, from the annulus between the tubular members and formation by circulating therein a slug of concentrate consisting essentially of a water-free mixture of surfactant and alcohol: and
   (b) following said slug of concentrate with an aqueous fluid cement whereby said slug of concentrate removes displaceable drilling fluid materials from the annulus at the pay zone but leaving some residual filter cake on the formation, and said well tubular members and residual filter cake both residing in a surface water-wetted condition after passage of said slug whereby hardening of the cement produces an improved bonding to both the well tubular members and the formation at the pay zone.

2. The process of claim 1 wherein said slug of concentrate is in volume sufficient to carry displaced drilling fluid materials in a suspended floc state without adversely effecting any water sensitive formations at the pay zone.

3. The process of claim 1 wherein said slug of concentrate contains less than 5 percent of water.

4. The process of claim 1 wherein the surfactant has a molecular weight in the range from about 150 to about 500 with predominately hydrophobic characteristics, and the surfactant is selected from the group comprising aliphatic amines, amides and aliphatic amine oxides with the amine and amide and amide oxides constituents having between 8 and 18 carbon atoms, and the alcohol is an aliphatic alcohol with between 5 and 8 carbon atoms.

5. The process of claim 4 wherein the alcohol and surfactant are used in a 50/50 mixture by volume.

6. The process of claim 4 wherein the alcohol is 2 ethyl hexanol.

7. The process of claim 1 wherein the surfactant is the amide reaction product of diethanolamine with an organic fatty monobasic acid of the general formula $C_NH_{2N+1}COOH$ wherein N is an integer between 12 and 18.

8. The process of claim 1 wherein the surfactant is the amide reaction product of diethanolamine with an organic fatty monobasic acid of the general formula $C_NH_{2N+1}COOH$ wherein N is an integer between 12 and 18, and said reaction product is neutralized with triethanol amine.

9. The process of claim 1 wherein the surfactant is the amide reaction product of diethanolamine amine with oleic acid, and this reaction product is neutralized with triethanol amine, and the alcohol is 2 ethyl hexanol.

* * * * *